(12) United States Patent
Jia et al.

(10) Patent No.: US 11,445,170 B2
(45) Date of Patent: Sep. 13, 2022

(54) EYEBALL CAMERA SYSTEM AND METHODS FOR DISPLAY SYSTEM CALIBRATION

(71) Applicant: Magic Leap, Inc., Plantation, FL (US)

(72) Inventors: Zhiheng Jia, Weston, FL (US); Jeffrey Todd Daiker, Lafayette, CO (US); Timothy Alan Ellis, Longmont, CO (US); Xiao Li, Cooper City, FL (US); Jeremy A. Grata, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 80 days.

(21) Appl. No.: 16/926,570

(22) Filed: Jul. 10, 2020

(65) Prior Publication Data

US 2021/0014477 A1 Jan. 14, 2021

Related U.S. Application Data

(60) Provisional application No. 62/873,641, filed on Jul. 12, 2019.

(51) Int. Cl.
*G09G 5/00* (2006.01)
*H04N 17/00* (2006.01)
(Continued)

(52) U.S. Cl.
CPC ....... *H04N 17/004* (2013.01); *G02B 27/0093* (2013.01); *G02B 27/01* (2013.01);
(Continued)

(58) Field of Classification Search
CPC ............... H04N 17/004; H04N 17/002; G02B 27/0093; G02B 27/01; G02B 27/017;
(Continued)

(56) References Cited

U.S. PATENT DOCUMENTS

2012/0056992 A1* 3/2012 Kuroda ................. G06T 19/006
348/46
2015/0241695 A1* 8/2015 Yang .................... G02B 27/017
345/8
(Continued)

FOREIGN PATENT DOCUMENTS

WO 2021011420 A1 1/2021

OTHER PUBLICATIONS

International Application No. PCT/US2020/041717, International Search Report and Written Opinion dated Oct. 13, 2020, 8 pages.
(Continued)

*Primary Examiner* — Thuy N Pardo
(74) *Attorney, Agent, or Firm* — Kilpatrick Townsend & Stockton LLP

(57) ABSTRACT

Embodiments provide a camera design (e.g., an eyeball camera) that mimics a human eye in geometry, optical performance and/or motion. The eyeball camera adopts the same cornea and pupil geometry from the human eye, and has the iris and pupil configured with multiple texture, color or diameter options. The resolution of the eyeball camera is designed to match the acuity of typical 20/20 human vision, and focus is adjusted from 0 to 4 diopters. A pair of eyeball cameras are mounted independently on two hexapods to simulate the human eye gaze and vergence. The perceived virtual and real world are calibrated and evaluated based on eye conditions like pupil location and gaze using the eyeball cameras. The eyeball camera serves as a bridge to combine the data from spatial computing like eye tracking, 3D geometry of the digital world, display color accuracy/uniformity, and display optical quality (sharpness, contrast, etc.).

24 Claims, 10 Drawing Sheets

(51) Int. Cl.
  *G06T 7/80* (2017.01)
  *G06T 7/70* (2017.01)
  *G06T 7/90* (2017.01)
  *G06T 7/60* (2017.01)
  *G02B 27/00* (2006.01)
  *G02B 27/01* (2006.01)

(52) U.S. Cl.
  CPC .............. *G02B 27/017* (2013.01); *G06T 7/60* (2013.01); *G06T 7/70* (2017.01); *G06T 7/80* (2017.01); *G06T 7/90* (2017.01); *H04N 17/002* (2013.01)

(58) Field of Classification Search
  CPC .... G06T 7/60; G06T 7/70; G06T 7/80; G06T 7/90; G06T 5/50; G06T 2207/10021; G06T 5/006
  USPC ........................... 345/7, 8, 9; 348/46, 49, 90
  See application file for complete search history.

(56) References Cited

U.S. PATENT DOCUMENTS

| | | | |
|---|---|---|---|
| 2016/0125653 A1* | 5/2016 | Denis | G06F 3/167 348/90 |
| 2017/0237963 A1* | 8/2017 | Cook | H04N 13/271 348/49 |
| 2017/0353714 A1 | 12/2017 | Poulad et al. | |
| 2018/0196263 A1 | 7/2018 | Vallius et al. | |
| 2018/0321137 A1* | 11/2018 | Ismagilov | G01N 21/253 |
| 2019/0230297 A1* | 7/2019 | Knorr | H04N 5/23222 |
| 2019/0235624 A1* | 8/2019 | Goldberg | G02B 27/0179 |
| 2019/0287513 A1* | 9/2019 | Alameh | G10L 17/00 |
| 2019/0313009 A1* | 10/2019 | Alameh | H04N 5/23296 |
| 2020/0026831 A1* | 1/2020 | Alameh | H04N 5/23258 |
| 2020/0089851 A1* | 3/2020 | Kumar Agrawal | H04L 9/3226 |
| 2020/0184058 A1* | 6/2020 | Alameh | G06F 1/3262 |
| 2020/0371596 A1* | 11/2020 | Lee | G06F 9/542 |
| 2020/0404424 A1* | 12/2020 | Alameh | H04R 3/005 |
| 2021/0185299 A1* | 6/2021 | Burian | G06F 1/163 |
| 2021/0208409 A1* | 7/2021 | Hong | B60K 35/00 |
| 2021/0223552 A1* | 7/2021 | Amayeh | G06V 20/64 |
| 2022/0011578 A1* | 1/2022 | Sinay | G02B 27/017 |
| 2022/0035451 A1* | 2/2022 | Schmidt | H04N 21/44008 |

OTHER PUBLICATIONS

Application No. PCT/US2020/041717, International Preliminary Report on Patentability, dated Jan. 27, 2022, 7 pages.

* cited by examiner

EYEBALL CAMERA SYSTEM AND METHODS FOR DISPLAY SYSTEM CALIBRATION

CROSS-REFERENCES TO RELATED APPLICATIONS

This application is a non-provisional of and claims the benefit to U.S. Patent Application No. 62/873,641 titled "EYEBALL CAMERA SYSTEM AND METHODS FOR DISPLAY SYSTEM CALIBRATION", filed on Jul. 12, 2019, which is herein incorporated by reference in its entirety for all purposes.

BACKGROUND

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

The wearable device may include augmented and/or virtual reality glasses. A camera may be coupled to the glasses. In order to view the actual location of a real-world object on the augmented and/or virtual reality glasses, the camera needs to be calibrated. Calibrating a camera may include determining intrinsic and/or extrinsic parameters of the camera. The intrinsic parameters represent a projective transformation from the 3-D camera's coordinates into the 2-D image coordinates. The intrinsic parameters may include the focal length ($f_x$, $f_y$), the principal point and the distortion coefficient(s). On the other hand, the extrinsic parameters represent a transformation from the world coordinate system to the coordinate system of the camera. The extrinsic parameters include a rotation matrix and a translation vector. The extrinsic parameters may help to determine the position of the camera center and the camera's heading in world coordinates.

Accordingly, the camera calibration may estimate the parameters of a lens and image sensor of a camera. The determined parameters may be used to correct for lens distortion, measure the size of an object in world units, or determine the location of the camera in a scene in a 3-D scene reconstruction.

As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Embodiments relate generally to image display systems and methods for display system calibration. Embodiments provide a camera design (e.g., an eyeball camera) that mimics a human eye in geometry, optical performance and/or motion. The eyeball camera adopts the same cornea and pupil geometry from the human eye and has the iris and pupil configured with multiple texture, color, or diameter options. The resolution of the eyeball camera is designed to match the acuity of typical 20/20 human vision and focus is adjusted in some implementations from 0 to 4 diopters. A pair of eyeball cameras can be mounted independently on two hexapods to simulate the human eye gaze and vergence. The perceived virtual and real world can thus be calibrated and evaluated based on eye conditions like pupil location and gaze using the eyeball cameras. The eyeball camera serves as a bridge to combine data from spatial computing like eye tracking, 3D geometry of the digital world, display color accuracy/uniformity, and display optical quality (sharpness, contrast, etc.).

Various embodiments provide a system for applying a correction to a virtual image display system. The system includes a display device configured to display a virtual image; an image capture device positioned in front of the display device; and a processor coupled to the display device and the image capture device to receive image data from the image capture device. The image capture device has one or more properties similar to a human eye. The processor is programmed to (a) receive a first image of a scene; (b) determine a first set of visual properties associated with the first image; (c) receive a second image of the scene captured with the image capture device; (d) determine a second set of visual properties associated with the second image; (e) identify a discrepancy between the first set of visual properties and the second set of visual properties; (f) determine a correction to apply to the virtual image display system to at least partially correct for the discrepancy using the one or more properties of the image capture device; and (g) apply the correction to the virtual image display system based on the one or more properties of the image capture device.

Various embodiments provide a method of applying a correction to a virtual image display system. The method includes receiving, by a processor, a first image of a scene from a real-world image capture device. The processor determines a first set of visual properties associated with the first image. The method further includes receiving, by the processor from an image capture device, a second image of the scene captured with the image capture device having one or more properties similar to a human eye. The image capture device is positioned in front of a display device. The method also includes determining, by the processor, a second set of visual properties associated with the second image; and identifying, by the processor, a discrepancy between the first set of visual properties and the second set of visual properties. The processor determines a correction to apply to the virtual image display system to at least partially correct for the discrepancy using the one or more properties of the image capture device; and applies the correction to the virtual image display system based on the one or more properties of the image capture device.

Numerous benefits are achieved by way of the present disclosure over conventional techniques. For example, embodiments provide methods and systems that calibrate a real-world image capture device and/or an AR/VR display system using one or more cameras (e.g., eyeball cameras) that mimic the human eye. The properties of the eyeball camera such as one or more of a cornea position, a cornea geometry, an eyeball position, a pupil size, a pupil position, a gaze distance, or a gaze orientation are known and can be controlled. Thus, the calibration can be performed using a set of known and controllable parameters. For example, it is possible to fix the gaze on infinity and calibrate the device using the data. Thus, embodiments provide for a more accurate calibration of an AR/VR display system, therefore resulting in a more accurate and seamless AR/VR experience.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

DETAILED DESCRIPTION

Embodiments are directed to image display systems and methods for display system calibration. Spatial computing enables overlay of digital world content on real world content in a spatially interacting way through combining digital light-fields, sensing, and computing. The digital content presented by spatial computing techniques preferably works in tandem with real-world surroundings, and more importantly the human eye-brain system, which is the ultimate judge for the system's success. As a result, to develop such a spatial computing system, it would be essential to have a proxy for the human eye-brain system to calibrate and verify the performance of the spatial computing system.

Embodiments provide a camera design that mimics human physiology (e.g., the human eye) at least in one or more of the following aspects: geometry, optical performance, and/or motion. Specifically, embodiments provide a camera (e.g., an eyeball camera) that not only adopts the same cornea and pupil geometry from the human eye, but also has an iris and pupil that can be configured with multiple texture, color, or diameter options. Furthermore, the resolution of the eyeball camera is designed to match the acuity of typical 20/20 human vision and focus can be adjusted by a piezo motor or other suitable mechanical system, for example, from 0 to 4 diopters.

According to various embodiments, a pair of eyeball cameras are mounted independently on two hexapods to simulate the human eye gaze and vergence. With the help of eyeball cameras, both perceived virtual and real world content can be calibrated and evaluated in deterministic and quantifiable eye conditions, for example, pupil location and gaze. According to various embodiments, the eyeball camera serves as a bridge to combine data from spatial computing like eye tracking, 3D geometry of the digital world, display color accuracy/uniformity, and display optical quality (sharpness, contrast, etc.) for a holistic view, which helps to effectively blend the virtual and real worlds together seamlessly.

Figure 1:
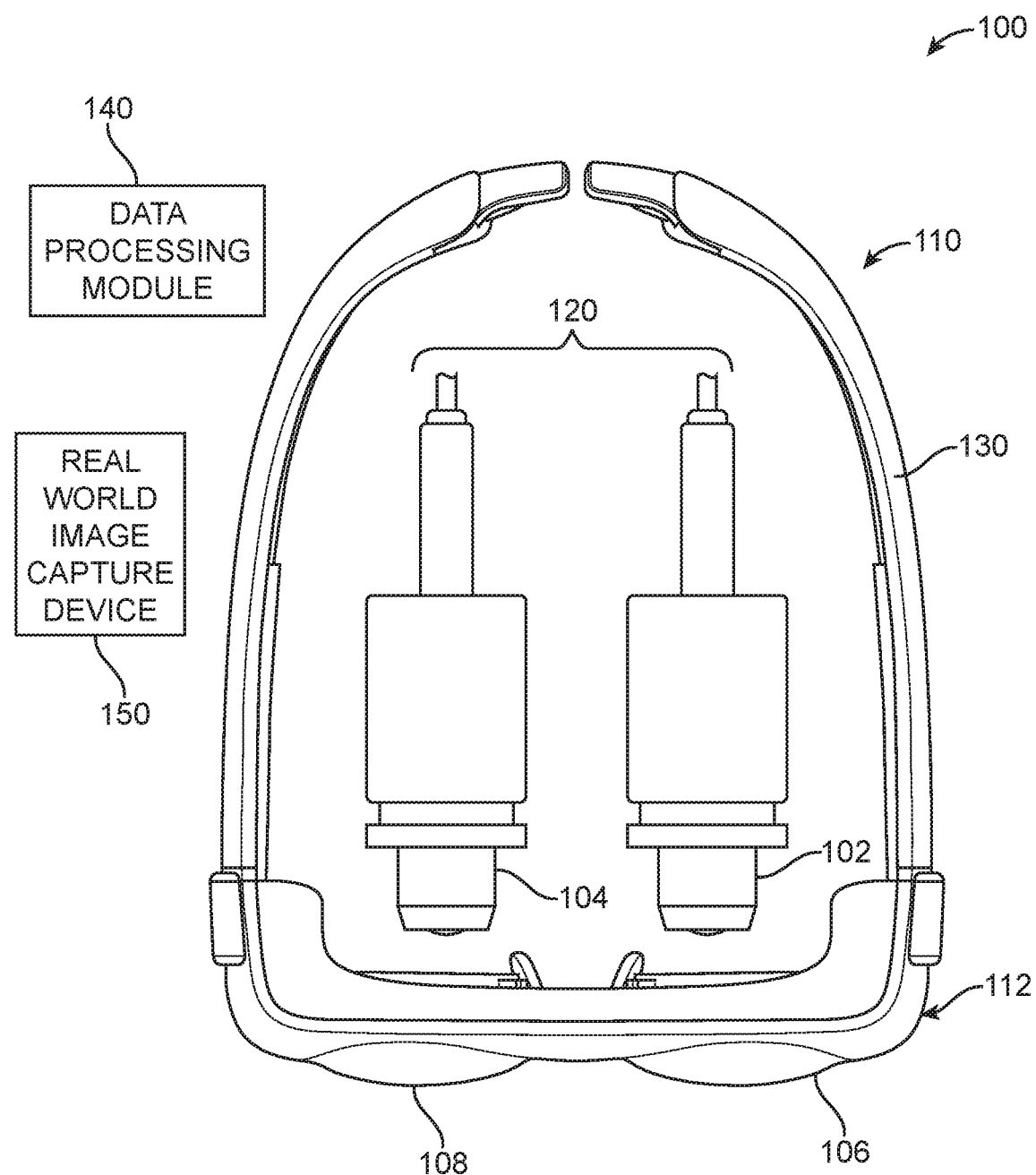
FIG. 1 illustrates an exemplary system for calibration of a display device according to some embodiments of the present disclosure.

FIG. 1 illustrates an exemplary system 100 for calibrating a virtual image display system 110. The system 100 may include the virtual image display system 110, an image capture device 120 and a data processing module 140. The virtual image display system 110 may include a display device 112 configured to display a virtual image, a real world image capture device 150 that is configured to capture and display images on the display device 112, and various mechanical and electronic modules and systems to support the functioning of the virtual image display system 110. The display device 112 may be coupled to a frame 130, which is wearable by a display system user, wearer, or viewer and that is configured to position the display device 112 in front of the eyes of the wearer during use. The display device 112 may be a light field display. In some embodiments, a speaker may be coupled to the frame 130 and positioned adjacent the ear canal of the user (in some embodiments, another speaker, not shown, is positioned adjacent the other ear canal of the user to provide for stereo/shapeable sound control). The real world image capture device 150 may be coupled to the display device 112 via a wired lead or wireless connectivity. In some embodiments, the real world image capture device 150 may be provided on the frame 130. In other embodiments, the real world image capture device 150 may be provided separately from the frame 130, and configured to be worn (e.g., on the head as a head camera, on the body as a belt, a wristlet, or a watch) by the user of the virtual image display system 110.

According to various embodiments, the image capture device 120 may be positioned in front of the display device 112. The system may also include a data processing module 140 that is operatively coupled, such as by a wired lead or wireless connectivity, to the virtual image display system 110 and the image capture device 120. The data processing module 140 may include various input/output devices and may receive data from external modules.

The data processing module 140 may include one or more processors configured to analyze and process data and/or image information such as an image or video information captured by the real world image capture device 150. The image or video data may be stored locally in the data processing module 140 and/or remotely in a remote data repository. In some embodiments, the remote data repository may comprise a digital data storage facility, which may be available through the internet or other networking configuration in a "cloud" resource configuration. In some embodiments, all data is stored and all computations are performed in the data processing module 140, allowing fully autonomous use from a remote module, whereas in other embodiments, data storage and/or computations are distributed. One of ordinary skill in the art would recognize many variations, modifications, and alternatives.

The display device 112 may include a first display 106 (e.g., a left display element) and a second display 108 (e.g., a right display element). Similarly, the image capture device 120 may include a first image capture element 102 (e.g., a left image capture element) and a second image capture element 104 (e.g., a right image capture element). The image capture device 120 may be positioned in front of the display device 112 such that the first image capture element 102 is positioned in front of the first display 106 and the second image capture element 104 is positioned in front of the second display 108.

According to various embodiments, the image capture device 120 may simulate a human eye. That is, the image capture device 120 may include properties similar to a human eye. For example, each of the first image capture element 102 and the second image capture element 104 may include a cornea position, a cornea geometry, an eyeball position, a pupil size, a pupil position, a gaze distance, a gaze orientation, and an iris color. These properties may be configurable and controlled for each one of the first image capture element 102 and the second image capture element 104 independently from each other. For example, the first image capture element 102 and the second image capture element 104 may include an eyeball camera.

Figure 2A:
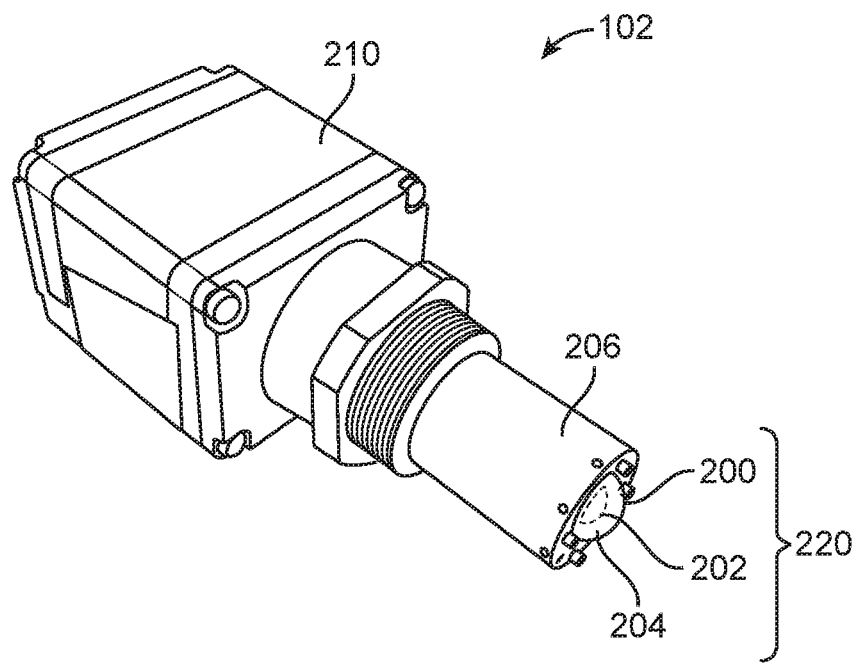
FIGS. 2A-2B illustrate an exemplary image capture element according to some embodiments of the present disclosure.
Figure 2B:
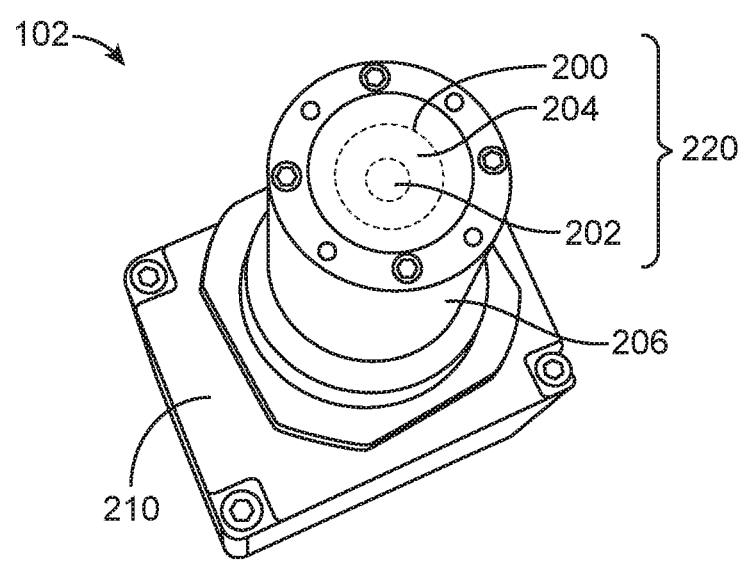

FIGS. 2A and 2B illustrate the first image capture element 102 according to some embodiments of the present disclosure. The second image capture element 104 is similar (or identical) to the first image capture element 102, and the description of the first image capture element 102 is applicable to the second image capture element 104. The first image capture element 102 and/or the second image capture element 104 may simulate a human eye, and include an artificial cornea 200, an artificial pupil 202, and an artificial iris 204 mounted at an end of a lens mount 206 that is coupled to a camera body 210. The artificial cornea 200, the artificial pupil 202, and the artificial iris 204 may be referred as an artificial eyeball 220. The camera body 210 may include a light proof box housing camera elements such as a camera shutter and an image sensor.

Various properties of the artificial cornea 200, the artificial pupil 202, and the artificial iris 204 may be configured according to various embodiments. For example, the position and/or the geometry of the artificial cornea 200, the position and size of the artificial pupil 202, and the position and/or the color of the artificial iris 204 may be configured, customized, or otherwise adjusted according to various embodiments. Similarly, the position of the artificial eyeball 220 at an end of the lens mount 206 may also be configured. Embodiments allow for determining, and adjusting, the vergence (including convergence—the rotating of the eyes toward each other—that occurs when looking at an object closer by, and divergence—the rotating of the eyes away from each other—that occurs when looking at an object far away), the gaze distance, and/or the gaze orientation of the first image capture element 102 and/or the second image capture element 104. For example, embodiments allow for fixing the gaze distance at infinity for a desired (predetermined) amount of time. Since a human eye is not capable of holding a steady gaze at infinity, the first image capture element 102 and/or the second image capture element 104 may mimic, and build upon the capabilities of the human eye. Thus, embodiments allow for a more accurate calibration of the virtual image display system 110 (namely the real world image capture device 150 of the virtual image display system 110).

According to various embodiments, the properties of the first image capture element 102 can be configured and adjusted independently from the second image capture element 104. Similarly, the first image capture element 102 can be controlled to move independently from the second image capture element 104. This may be achieved by placing each of the first image capture element 102 and the second image capture element 104 on a separate, individual hexapod, as illustrated in FIG. 3.

Figure 3:
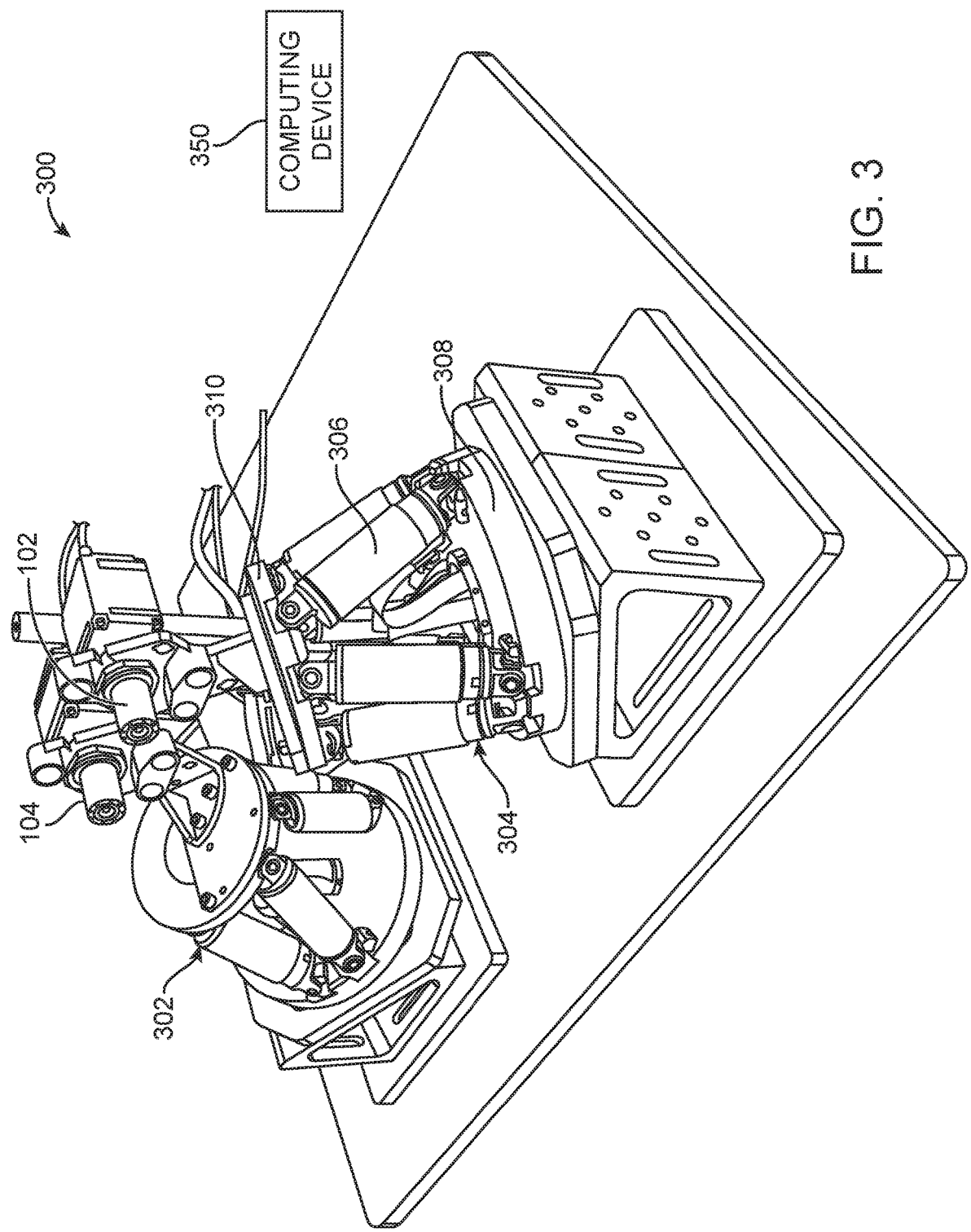
FIG. 3 is a simplified schematic diagram illustrating a camera rig according to some embodiments of the present disclosure.

FIG. 3 is a simplified schematic diagram illustrating a camera rig 300 according to some embodiments of the present disclosure. The camera rig 300 may include a first controllable mount 302 and a second controllable mount 304. The controllable mounts 302, 304 may be controlled to move independently from each other, or simultaneously with each other. The controllable mounts 302, 304 may be controlled to mimic human eye muscles as well as a human head.

As illustrated in FIG. 3, the first image capture element 102 may be mounted on the first controllable mount 302, and the second image capture element 104 may be mounted on the second controllable mount 304. The camera rig 300 and the image capture elements 102, 104 may work together to mimic (e.g., simulate) a pair of human eyes moving in their sockets.

According to various embodiments, the controllable mounts 302, 304 may include one or more actuators 306 (e.g., linear actuators, prismatic joints, or the like) that are coupled to a bottom platform 308 and/or a top platform 310. In some embodiments, the controllable mounts 302, 304 may be in the form of a parallel manipulator including six linear actuators.

The controllable mounts 302, 304 may be controlled via a computing device 350 that is configured to communicate with the controllable mounts 302, 304 via a wired or wireless connection. In some embodiments, the computing device 350 may include the data processing module 140, or may be coupled to the data processing module 140 to work in tandem with the data processing module 140. According to various embodiments, the computing device 350 may send commands (e.g., in the form of signals) to the controllable mounts 302, 304 and receive feedback (e.g., in the form of signals) from the controllable mounts 302, 304.

According to various embodiments, the camera rig 300 may be used during production of a virtual image display system to fine tune the calibration of the virtual image display system. Yet in some embodiments, the camera rig 300 may be sized and dimensioned to be provided at a retail location where the users may bring their virtual image display systems 110 for calibration or to fine tune the virtual image display system according to the user's particular eye properties (e.g., geometry, color, sight).

Embodiments allow for calibrating a virtual image display system (e.g., a real world image capture device of an AR/VR system) using an image capture device (including one or more image capture elements). In some embodiments, the image capture device may be controlled or configured to mimic a human eye.

Figure 4:
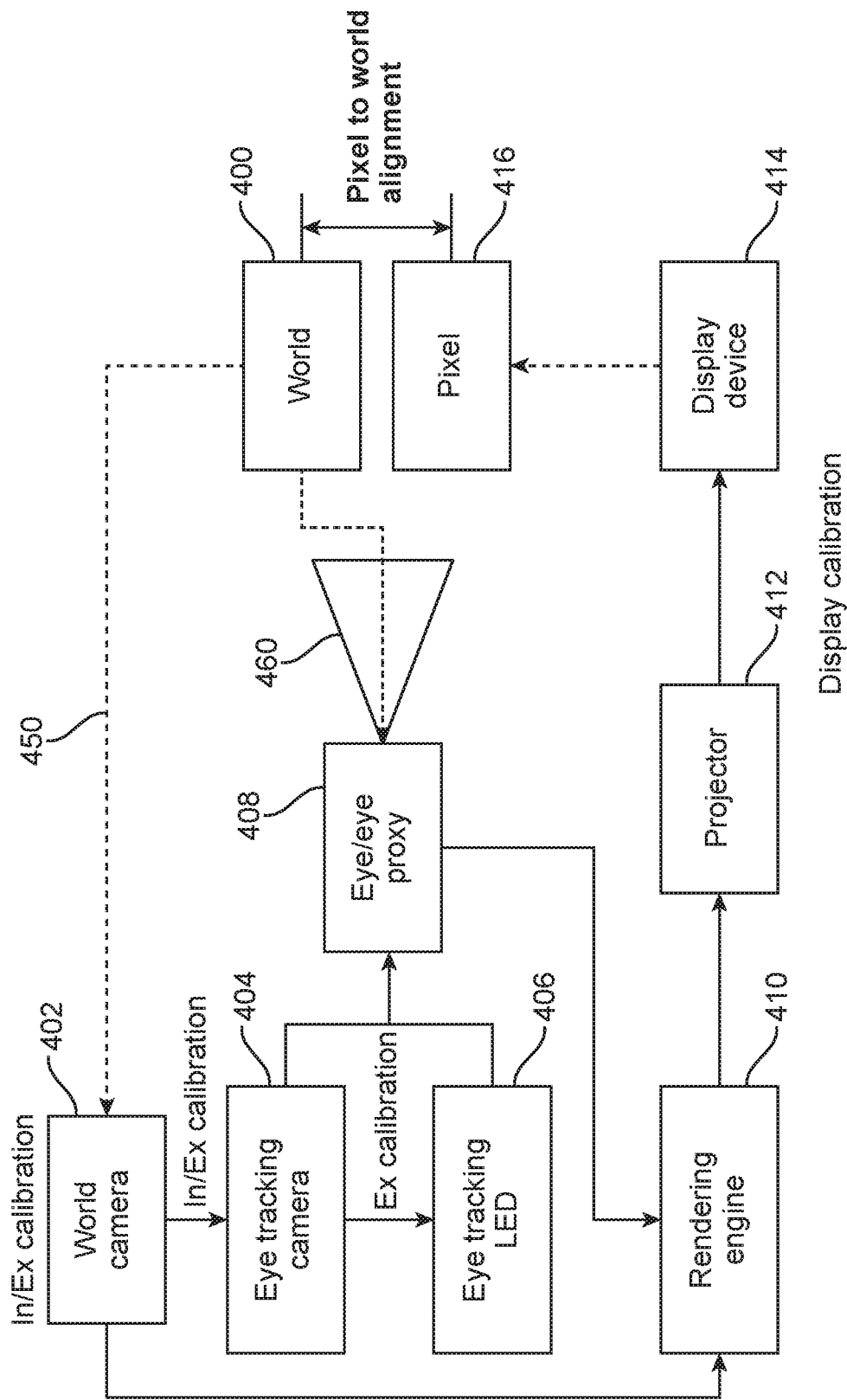
FIG. 4 is an exemplary block diagram illustrating a method for calibrating a virtual image display system according to some embodiments of the present disclosure.

FIG. 4 shows an exemplary block diagram illustrating a method for calibrating a virtual image display system according to some embodiments of the present disclosure.

An image 450 of a scene, an environment or an object in real world 400 may be captured using a real-world image capture device (e.g., world camera) 402. The captured image 450 may be sent to a rendering engine 410 that then processes the received image and transmits the processed image to a projector 412 that will then display on a display device (e.g., the eyepiece of the virtual image display system) 414. The displayed image may correspond to a group of pixels 416 illuminated on the display device 414. However, the displayed image may not exactly match (e.g., align) with the real world 400 that the image is supposed to represent. For example, a contour of an object in the image may not align with the contour of the object in real world. To correct this mismatch, the real-world image capture device 402 may need to be calibrated.

For example, the image captured using the real-world image capture device 402 may be processed (e.g., refined) using data from an eye tracking camera 404 and one or more eye tracking light emitters (e.g., light emitting diodes (LEDs)) 406. The data from the eye tracking camera 404 and the one or more eye tracking light emitters 406 may include additional information about where the user is looking to render the image at a specific depth or range. For example, vergence of the eyes may be determined using the eye tracking camera 404 and one or more eye tracking light emitters 406, and calibration/adjustment for the virtual image display system may be determined using a vergence/accommodation model.

According to various embodiments, the eye tracking camera 404 detects a cornea position of the user and determines the eye aperture based on the cornea position, and calculates the gaze of the user. That is, the eye tracking camera 404 estimates the eye position of the user. Therefore, it would be desirable to know the details of the eye geometry, position and gaze of the user to more accurately calibrate the virtual image display system.

Embodiments may use an image capture device 408 simulating a human eye (or a pair of human eyes) for calibrating the virtual image display system. The image capture device 408 may be used in connection with the eye tracking camera 404. According to various embodiments, the image capture device 408 may have the physical properties of a human eye. For example, as described in connection with FIGS. 2A-2B, the image capture device 408 may have a geometry similar to the human eye geometry including an artificial cornea, an artificial pupil, and an artificial iris. Thus, the eye tracking camera 404 and the one or more eye tracking light emitters 406, when used in connection with the image capture device 408, provide more accurate data for calibrating the virtual image display system.

Since the properties of the image capture device 408 are known, the eye tracking camera 404 and the one or more eye tracking light emitters 406 use the data for the properties (e.g., cornea position, a cornea geometry, an eyeball position, a pupil size, a pupil position, a gaze distance, and a gaze orientation) instead of estimating or determining these properties. A correction for the virtual image display system may be determined based on one or more of these properties of the image capture device 408 in order to more accurately align the image 450 received from the real-world image capture device 402 with an image 460 of the same scene, environment or object in real world 400 captured using the image capture device 408.

The rendering engine 410 may receive the image 460 from the image capture device 408 and compare the image 460 to the image 450 received from the real-world image capture device 402. If the image 460 and the image 450 are determined not to overlap to a predetermined degree or target, the rendering engine 410 may determine one or more corrections to be applied to the real-world image capture device 402 to more accurately capture an image of the scene, environment, or object in real world 400. The virtual image display system (and more particularly, the real-world image capture device 402 and/or the display device 414) may be calibrated until the image 450 captured by the real-world image capture device 402 aligns with the image 460 captured with the image capture device 408 to within a predetermined threshold.

Figure 5:
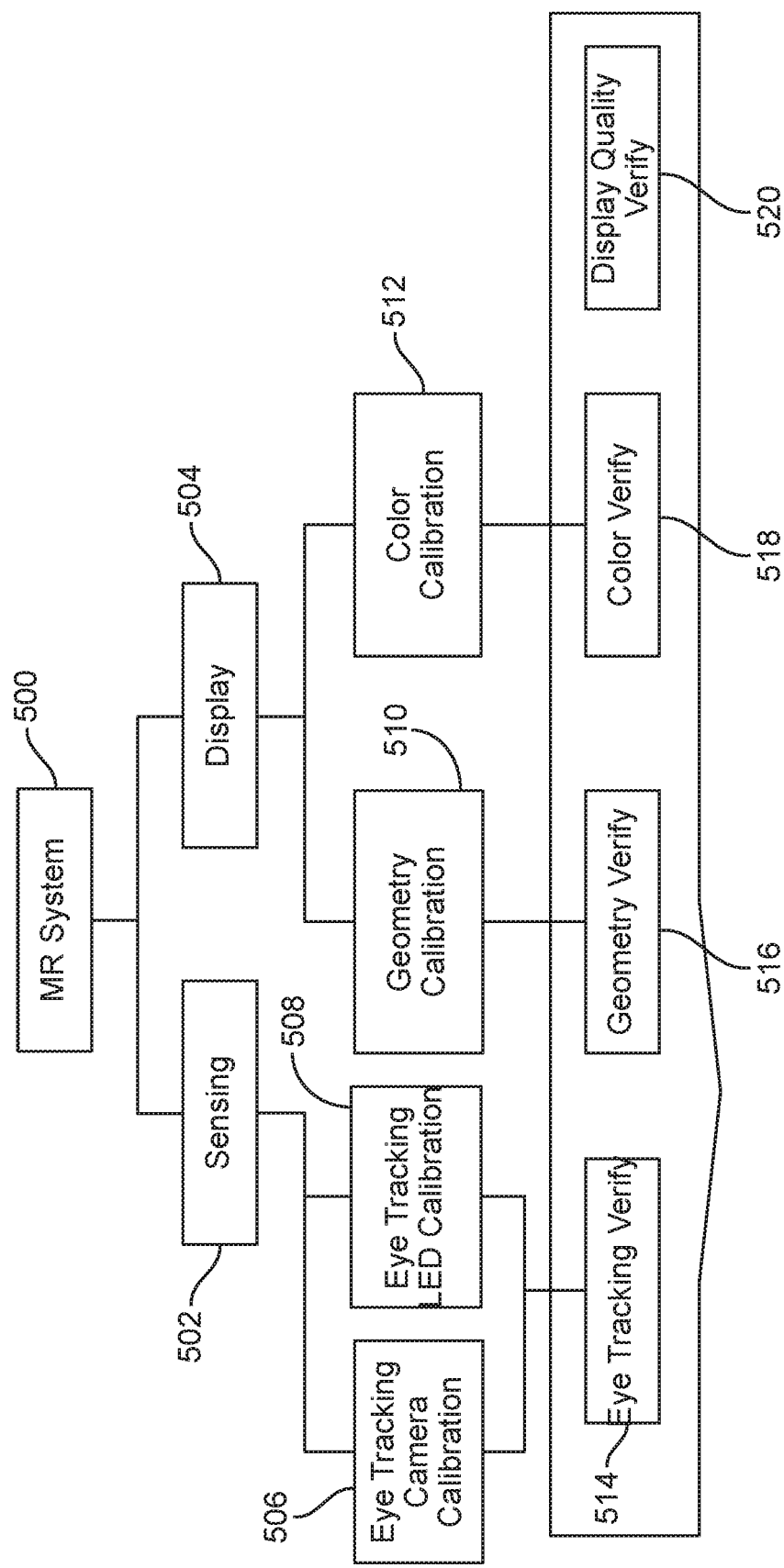
FIG. 5 is an exemplary block diagram illustrating various calibrations that may be performed in connection with a virtual image display system according to some embodiments of the present disclosure.

FIG. 5 shows an exemplary block diagram illustrating various calibrations that may be performed in connection with a virtual image display system. As described in connection with FIG. 1 as well, the virtual image display system 500 may have a sensing component 502 (e.g., the real world image capture device 150) and a display component 504 (e.g., the display device 112). The sensing component 502 may be calibrated using the eye tracking camera calibration 506 and eye tracking LED calibration 508 to verify and improve the eye tracking 514. The display component 504 can be calibrated using geometry calibration 510 to verify and improve the geometry 516 of the displayed objects, and color calibration 512 to verify and improve the color 518 of the displayed objects. Overall, the display quality 520 of the virtual image display system may be verified and improved.

The image capture device simulating the human eye described in connection with the various embodiments may be used to combine and concurrently perform all above-described calibrations to improve eye tracking, geometry, color, and display quality for the virtual image display system.

Figure 6:
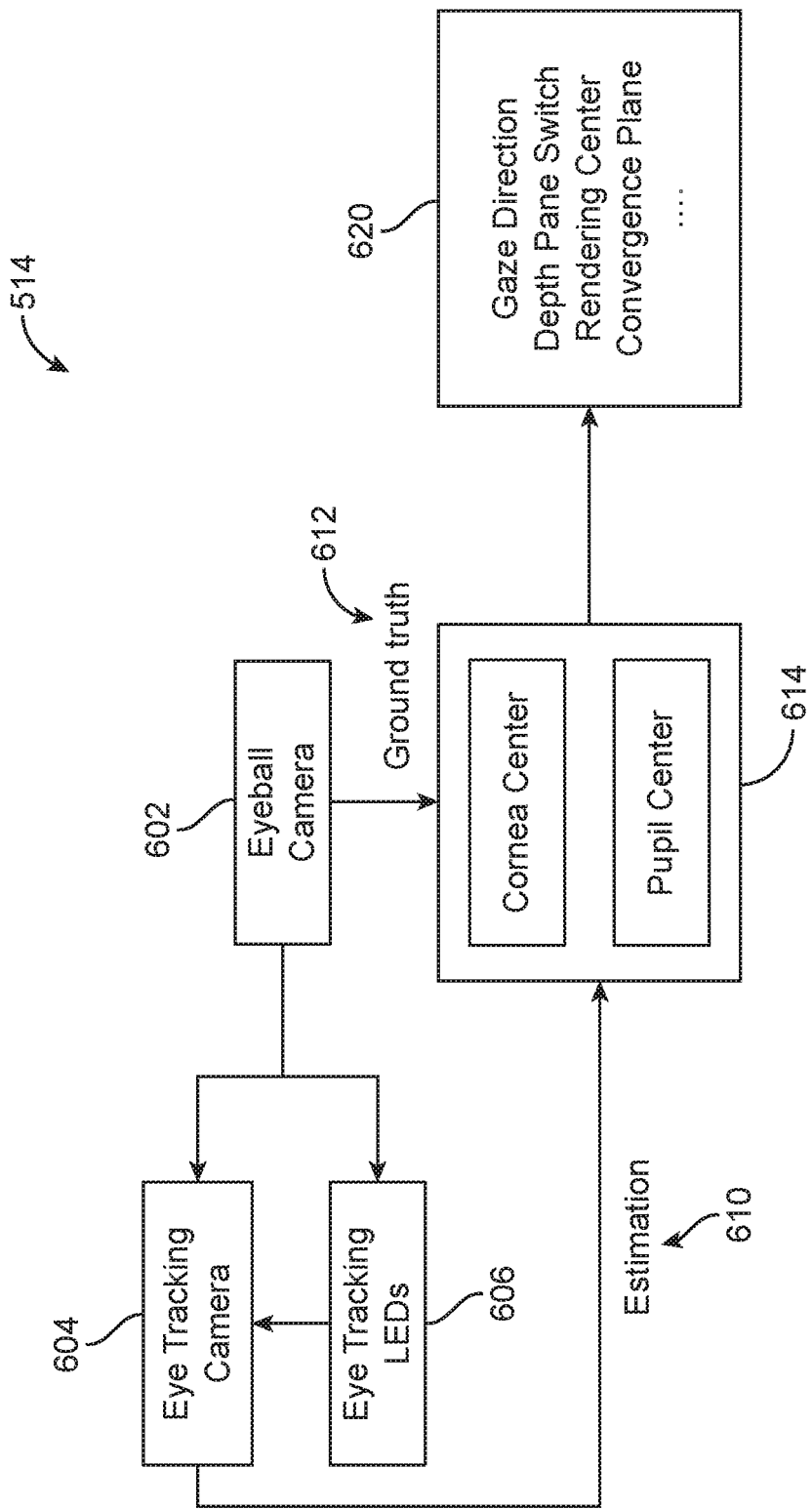
FIG. 6 is an exemplary block diagram illustrating eye tracking verification performed in connection with a virtual image display system according to some embodiments of the present disclosure.

FIG. 6 shows an exemplary block diagram illustrating a detailed view of the eye tracking verification. The eye tracking camera 604 and the eye tracking LEDs 606 can estimate properties 610 of the image capture device 602 such as a cornea position, a cornea geometry, an eyeball position, a pupil size, a pupil position, a gaze distance, and a gaze orientation. The estimated properties 610 may be provided to a computing device 614 (e.g., data processing module 140) along with the actual values 612 for these properties. The computing device may compare the estimated properties 610 with the actual values 612 for these properties of the image capture device 602 and determine one or more corrections 620 for the virtual image display system based on gaze direction, depth pane switch, rendering center, convergence plane, etc.

Figure 7:
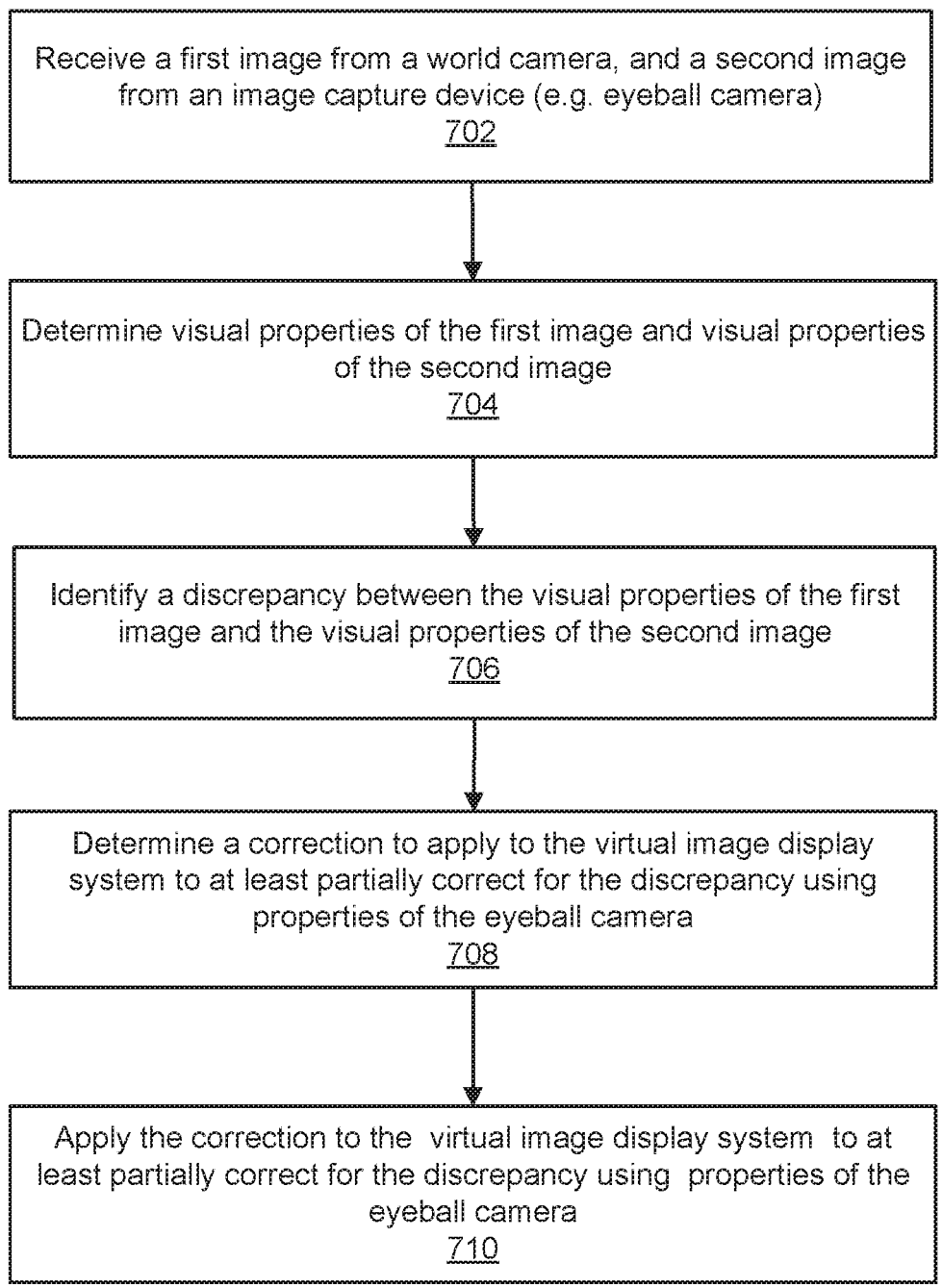
FIG. 7 is a simplified flowchart illustrating a method for determining and applying a correction to the virtual image display system according to some embodiments of the present disclosure.

FIG. 7 is a simplified flowchart 700 illustrating a method for determining and applying a correction to the virtual image display system according to some embodiments of the present disclosure. The virtual image display system may include at least a display device and a world camera. According to various embodiments, an image capture element simulating a human eye (or a pair of human eyes) may be coupled to the virtual image display system.

At block 702, a computing device including a processor receives a first image and a second image from a virtual image display system. The first image may be captured using a world camera of the virtual image display system and the second image may be captured using an image capture device (e.g., an eye ball camera). The image capture device has one or more properties similar to a human eye including, but not limited to, a cornea position, a cornea geometry, an eyeball position, a pupil size, a pupil position, a gaze distance, and/or a gaze orientation. These properties of the image capture device may have predetermined values, and may be configurable.

At block 704, the computing device may determine visual properties of the first image and the second image. The computing device may determine a first set of visual properties associated with the first image and a second set of visual properties associated with the second image. The first set of visual properties and the second set of visual properties may include special positioning of an object (e.g., a location, coordinates of an object in the image, or a distance between two objects or points in the image), color of an object (e.g., hue, saturation, or contrast of an object), geometry attributes of an object (collinearity, curvature, length, width, breadth, added marks, missing marks, numerosity, shape, size, spatial grouping, and spatial orientation of elements of the object).

At block 706, the computing device may identify a discrepancy between the first set of visual properties of the first image and the second set of visual properties of the second image.

At block 708, the computing device may determine a correction to apply to the virtual image display system to at least partially correct for the discrepancy using the one or more known properties of the image capture device.

At block 710, the computing device may apply the correction to the virtual image display system based on the one or more properties of the image capture device. The correction may calibrate the display device or the world camera of the virtual image display system.

It should be appreciated that the specific steps illustrated in FIG. 7 provide a particular method for determining and applying a correction to the virtual image display system according to some embodiments of the present disclosure. Other sequences of steps may also be performed according to alternative embodiments. For example, alternative embodiments may perform the steps outlined in FIG. 7 in a different order. Moreover, the individual steps illustrated in FIG. 7 may include multiple sub-steps that may be performed in various sequences as appropriate to an individual step. Furthermore, additional steps may be added or removed depending on the particular applications. One of ordinary skill in the art would recognize many variations, modifications, and alternatives.

Figure 8:
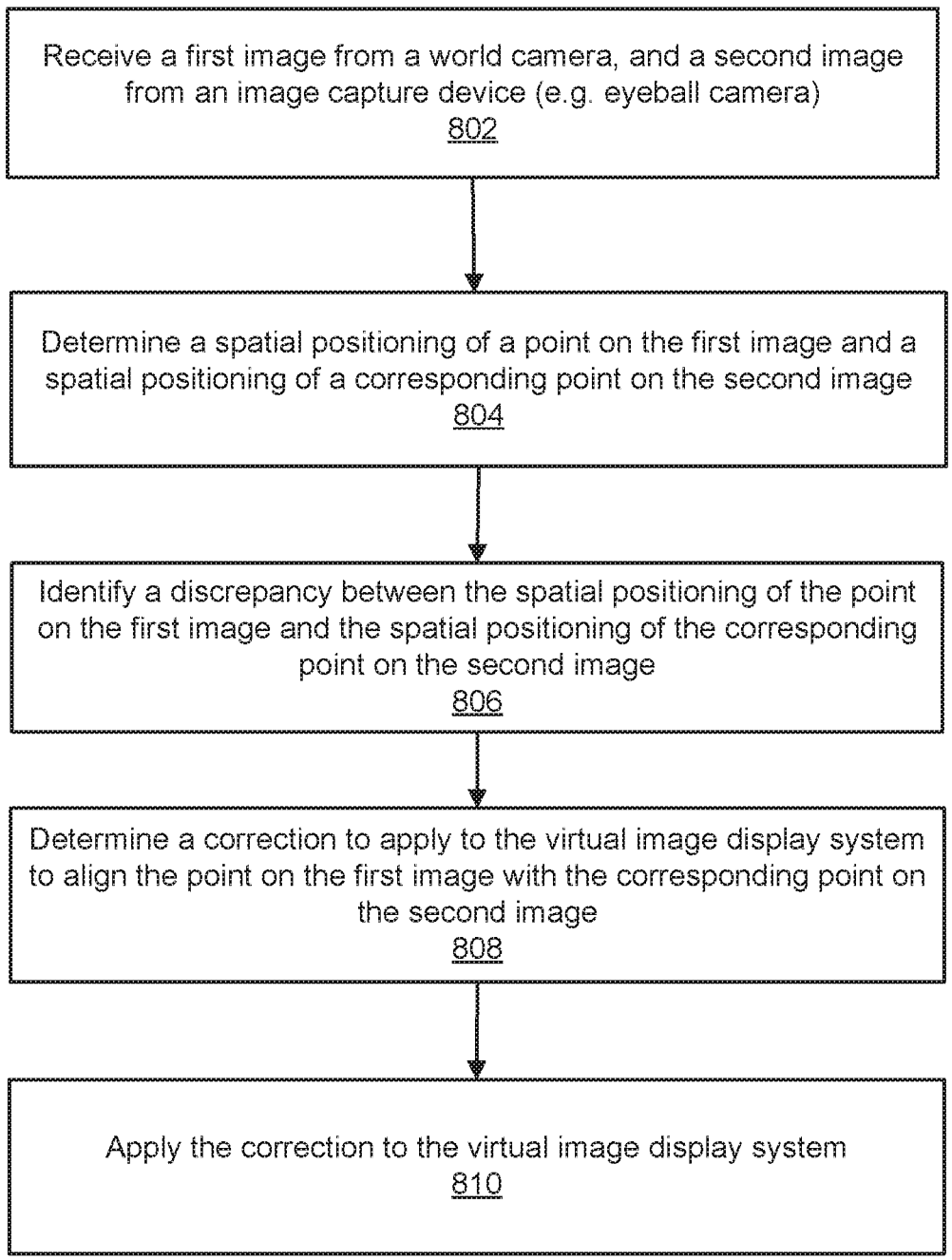
FIG. 8 is a simplified flowchart illustrating a method for determining and applying a correction to the virtual image display system to adjust display color according to some embodiments of the present disclosure.

FIG. 8 is a simplified flowchart 800 illustrating a method for determining and applying a correction to the virtual image display system to adjust display color according to some embodiments of the present disclosure. The virtual image display system may include at least a display device and a world camera. According to various embodiments, an image capture element simulating a human eye (or a pair of human eyes) may be coupled to the virtual image display system.

At block 802, a computing device including a processor receives a first image and a second image from a virtual image display system. The first image may be captured using a world camera of the virtual image display system, and the second image may be captured using an image capture device (e.g., an eye ball camera). The image capture device has one or more properties similar to a human eye including, but not limited to, a cornea position, a cornea geometry, an eyeball position, a pupil size, a pupil position, a gaze distance, and/or a gaze orientation. These properties of the image capture device may have predetermined values, and may be configurable.

At block 804, the computing device may determine visual properties of the first image and the second image. The computing device may determine a spatial positioning of a point in the first image, and a spatial positioning of a corresponding point in the second image.

At block 806, the computing device may identify a discrepancy between the spatial positioning of the point in the first image and the spatial positioning of the corresponding point in the second image.

At block 808, the computing device may determine a correction to apply to the virtual image display system to align the point in the first image with the corresponding point in the second image.

At block 810, the computing device may apply the correction to the virtual image display system based on the one or more properties of the image capture device. The correction may calibrate the display device or the world camera of the virtual image display system, and result in the point of the first image aligning more accurately with the corresponding point in the second image.

It should be appreciated that the specific steps illustrated in FIG. 8 provide a particular method for determining and applying a correction to the virtual image display system to adjust display color according to some embodiments of the present disclosure. Other sequences of steps may also be performed according to alternative embodiments. For example, alternative embodiments may perform the steps outlined in FIG. 8 in a different order. Moreover, the individual steps illustrated in FIG. 8 may include multiple sub-steps that may be performed in various sequences as appropriate to an individual step. Furthermore, additional steps may be added or removed depending on the particular applications. One of ordinary skill in the art would recognize many variations, modifications, and alternatives.

Figure 9:
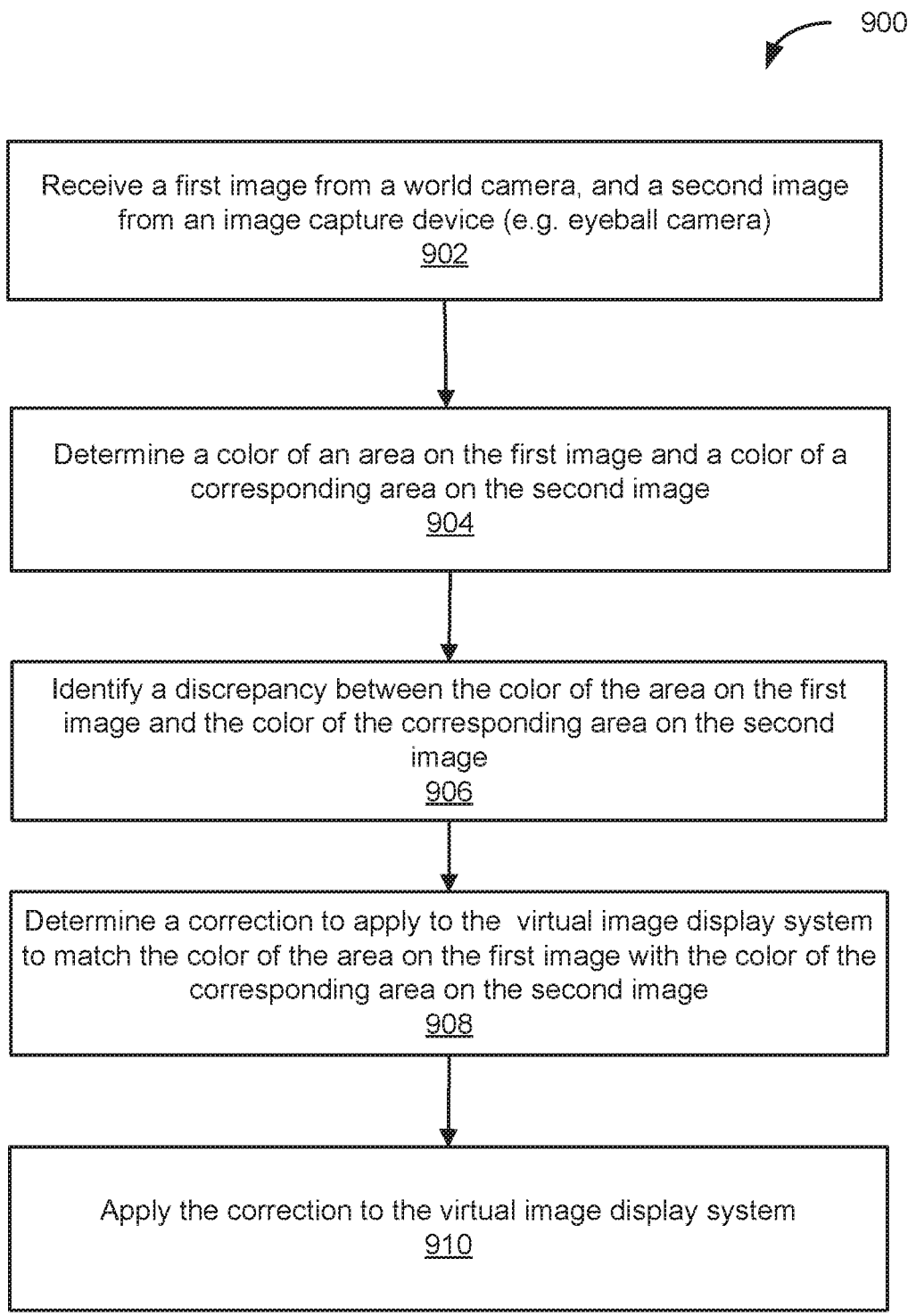
FIG. 9 is a simplified flowchart illustrating a method for determining and applying a correction to the virtual image display system to adjust geometry attributes according to some embodiments of the present disclosure.

FIG. 9 is a simplified flowchart 900 illustrating a method for determining and applying a correction to the virtual image display system to adjust geometry attributes according to some embodiments of the present disclosure. The virtual image display system may include at least a display device and a world camera. According to various embodiments, an image capture element simulating a human eye (or a pair of human eyes) may be coupled to the virtual image display system.

At block 902, a computing device including a processor receives a first image and a second image from a virtual image display system. The first image may be captured using a world camera of the virtual image display system, and the second image may be captured using an image capture device (e.g., an eye ball camera). The image capture device has one or more properties similar to a human eye including, but not limited to, a cornea position, a cornea geometry, an eyeball position, a pupil size, a pupil position, a gaze distance, and/or a gaze orientation. These properties of the image capture device may have predetermined values, and may be configurable.

At block 904, the computing device may determine visual properties of the first image and the second image. The computing device may determine a color (e.g., a hue, a saturation, or a contrast) of an area (e.g., a point, an object, or a pixel) in the first image, and a color of a corresponding area in the second image.

At block 906, the computing device may identify a discrepancy between the color of the area in the first image and the color of the corresponding area in the second image.

At block 908, the computing device may determine a correction to apply to the virtual image display system to match the color of the area in the first image with the color of the corresponding area in the second image.

At block 910, the computing device may apply the correction to the virtual image display system based on the one or more properties of the image capture device. The correction may calibrate the display device or the world camera of the virtual image display system, and result in the color of the area in the first image matching more accurately with the color of the corresponding area in the second image. The correction may adjust one or more of the hue, saturation and contrast of the image displayed on the display device.

It should be appreciated that the specific steps illustrated in FIG. 9 provide a particular method for determining and applying a correction to the virtual image display system to adjust geometry attributes according to some embodiments of the present disclosure. Other sequences of steps may also be performed according to alternative embodiments. For example, alternative embodiments may perform the steps outlined in FIG. 9 in a different order. Moreover, the individual steps illustrated in FIG. 9 may include multiple sub-steps that may be performed in various sequences as appropriate to an individual step. Furthermore, additional steps may be added or removed depending on the particular applications. One of ordinary skill in the art would recognize many variations, modifications, and alternatives.

Figure 10:
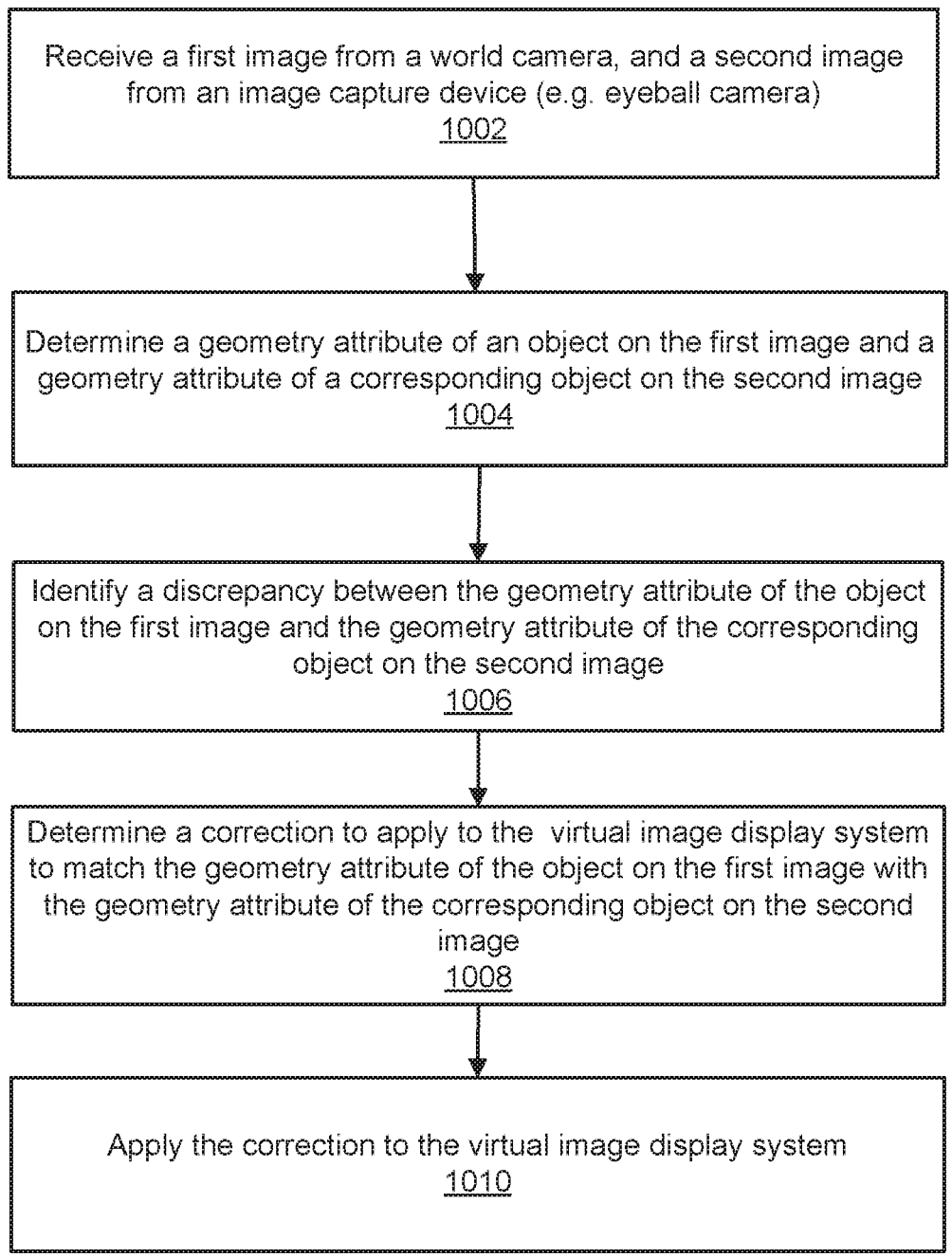
FIG. 10 is a simplified flowchart illustrating a method for determining and applying a correction to the virtual image display system to adjust spatial positioning according to some embodiments of the present disclosure.

FIG. 10 is a simplified flowchart 1000 illustrating a method for determining and applying a correction to the virtual image display system to adjust spatial positioning according to some embodiments of the present disclosure. The virtual image display system may include at least a display device and a world camera. According to various embodiments, an image capture element simulating a human eye (or a pair of human eyes) may be coupled to the virtual image di splay system.

At block 1002, a computing device including a processor receives a first image and a second image from a virtual image display system. The first image may be captured using a world camera of the virtual image display system, and the second image may be captured using an image capture device (e.g., an eye ball camera). The image capture device has one or more properties similar to a human eye including, but not limited to, a cornea position, a cornea geometry, an eyeball position, a pupil size, a pupil position, a gaze distance, and/or a gaze orientation. These properties of the image capture device may have predetermined values, and may be configurable.

At block 1004, the computing device may determine visual properties of the first image and the second image. The computing device may determine a geometry attribute (e.g., form, collinearity, curvature, length, width, breadth, added marks, missing marks, numerosity, shape, size, spatial grouping, and/or spatial orientation) of an object in the first image, and a geometry attribute of a corresponding object in the second image.

At block 1006, the computing device may identify a discrepancy between the geometry attribute of the object in the first image and the geometry attribute of the corresponding object in the second image.

At block 1008, the computing device may determine a correction to apply to the virtual image display system to match the geometry attribute of the object in the first image with the geometry attribute of the corresponding object in the second image.

At block 1010, the computing device may apply the correction to the virtual image display system based on the one or more properties of the image capture device. The correction may calibrate the display device or the world camera of the virtual image display system, and result in the geometry attribute of the object in the first image matching more accurately with the geometry attribute of the corresponding area in the second image. The correction may adjust one or more of the collinearity, curvature, length, width, breadth, added marks, missing marks, numerosity, shape, size, spatial grouping, and/or spatial orientation of an object displayed on the display device.

It should be appreciated that the specific steps illustrated in FIG. 10 provide a particular method for determining and applying a correction to the virtual image display system to adjust spatial positioning according to some embodiments of the present disclosure. Other sequences of steps may also be performed according to alternative embodiments. For example, alternative embodiments may perform the steps outlined in FIG. 10 in a different order. Moreover, the individual steps illustrated in FIG. 10 may include multiple sub-steps that may be performed in various sequences as appropriate to an individual step. Furthermore, additional steps may be added or removed depending on the particular applications. One of ordinary skill in the art would recognize many variations, modifications, and alternatives.

Embodiments provide a number of advantages over prior systems. Embodiments allow calibrating the real-world image capture device and/or an AR/VR display system using one or more cameras (e.g., eyeball cameras) that mimic the human eye. The properties of the eyeball camera such as one or more of a cornea position, a cornea geometry, an eyeball position, a pupil size, a pupil position, a gaze distance, or a gaze orientation are known and can be controlled. Thus, the calibration can be performed using a set of known and controllable parameters. For example, it is possible to fix the gaze on infinity and calibrate the device using the data. Thus, embodiments provide for a more accurate calibration of an AR/VR display system therefore resulting in a more accurate and seamless AR/VR experience.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for applying a correction to a virtual image display system, the system comprising:
a display device configured to display a virtual image;
an image capture device positioned in front of the display device, wherein the image capture device has one or more properties similar to a human eye; and
a processor coupled to the display device and the image capture device to receive image data from the image capture device, wherein the processor is programmed to:
receive a first image of a scene;
determine a first set of visual properties associated with the first image;
receive a second image of the scene captured with the image capture device;
determine a second set of visual properties associated with the second image, wherein the first set of visual properties and the second set of visual properties include at least one of a spatial positioning, a color or a geometry attribute;
identify a discrepancy between at least one of the first set of visual properties of the first image and at least one of the second set of visual properties of the second image corresponding to he at least one of the first set of visual properties of the first image;
determine a correction to apply to the virtual image display system to at least partially correct for the discrepancy using the one or more properties of the image capture device, wherein the correction matches the spatial positioning, the color or the geometry attribute associated with the first image to that of the second image; and
apply the correction to the virtual image display system based on the one or more properties of the image capture device.

2. The system of claim 1, wherein the one or more properties of the image capture device include one or more of a cornea position, a cornea geometry, an eyeball position, a pupil size, a pupil position, a gaze distance, or a gaze orientation.

3. The system of claim 1, wherein the one or more properties of the image capture device are configurable.

4. The system of claim 1, wherein the display device comprises a first display associated with a first eye of a user and a second display associated with a second eye of the user, and wherein the image capture device includes a first image capture element positioned in front of the first display and a second image capture element positioned in front of the second display.

5. The system of claim 4, wherein the first image capture element and the second image capture element are configured to move independently from one another.

6. The system of claim 4, wherein one or more properties of the first image capture element are configurable independently from one or more properties of the second image capture element.

7. The system of claim 1, further comprising:
a real-world image capture device coupled to the display device and configured to capture the first image, wherein the correction is applied to the virtual image display system to calibrate the real-world image capture device.

8. The system of claim 1, wherein the first set of visual properties and the second set of visual properties include the spatial positioning, wherein the processor is further programmed to:
determine a spatial positioning of a point in the first image;
identify the discrepancy between the spatial positioning of the point in the first image and a spatial positioning of a corresponding point in the second image;
determine the correction to apply to the virtual image display system to align the point in the first image with the corresponding point in the second image; and
apply the correction to the virtual image display system.

9. The system of claim 1, wherein the first set of visual properties and the second set of visual properties include the color, wherein the processor is further programmed to:
determine a color of an area in the first image;
identify the discrepancy between the color of the area in the first image and a color of a corresponding area in the second image;
determine the correction to apply to the virtual image display system to match the color of the area in the first image with the color of the corresponding area in the second image; and
apply the correction to the virtual image display system.

10. The system of claim 9, wherein the correction includes one or more of a correction in hue, saturation, or contrast.

11. The system of claim 1, wherein the first set of visual properties and the second set of visual properties include the geometry attribute, wherein the processor is further programmed to:
determine the geometry attribute of an object in the first image;
identify the discrepancy between the geometry attribute of the object in the first image and a geometry attribute of a corresponding object in the second image;
determine the correction to apply to the virtual image display system to match the geometry attribute of the object in the first image with the geometry attribute of the corresponding object in the second image; and
apply the correction to the virtual image display system.

12. The system of claim 11, wherein the correction includes one or more of a correction in collinearity, curvature, length, width, breadth, added marks, missing marks, numerosity, shape, size, spatial grouping, or spatial orientation of the object in the second image.

13. A method for applying a correction to a virtual image display system, the method comprising:
receiving, by a processor, a first image of a scene from a real-world image capture device;
determining, by the processor, a first set of visual properties associated with the first image;
receiving, by the processor from an image capture device, a second image of the scene captured with the image capture device having one or more properties similar to a human eye, wherein the image capture device is positioned in front of a display device;
determining, by the processor, a second set of visual properties associated with the second image, wherein the first set of visual properties and the second set of visual properties include at least one of a spatial positioning, a color or a geometry attribute;
identifying, by the processor, a discrepancy between at least one of the first set of visual properties of the first image and at let one of the second set of visual properties of the second image corresponding to the at least one of first set of visual properties of the first image;

determining, by the processor, a correction to apply to the virtual image display system to at least partially correct for the discrepancy using the one or more properties of the image capture device, wherein the correction matches the spatial positioning, the color or the geometry attribute associated with the first image to that of the second image; and applying, by the processor, the correction to the virtual image display system based on the one or more properties of the image capture device.

14. The method of claim 13, wherein the one or more properties of the image capture device include one or more of a cornea position, a cornea geometry, an eyeball position, a pupil size, a pupil position, a gaze distance, or a gaze orientation.

15. The method of claim 13, wherein the one or more properties of the image capture device are configurable.

16. The method of claim 13, wherein the display device comprises a first display associated with a first eye of a user and a second display associated with a second eye of the user, and wherein the image capture device includes a first image capture element positioned in front of the first display and a second image capture element positioned in front of the second display.

17. The method of claim 16, wherein the first image capture element and the second image capture element are configured to move independently from one another.

18. The method of claim 16, wherein one or more properties of the first image capture element are configurable independently from one or more properties of the second image capture element.

19. The method of claim 13, wherein the first image is received from a real-world image capture device coupled to the display device, wherein applying the correction further comprises:

calibrating the real-world image capture device.

20. The method of claim 13, wherein the first set of visual properties and the second set of visual properties include the spatial positioning, and the method further comprises:

determining, by the processor, a spatial positioning of a point in the first image;

identifying, by the processor, the discrepancy between the spatial positioning of the point in the first image and a spatial positioning of a corresponding point in the second image;

determining, by the processor, the correction to apply to the virtual image display system to align the point in the first image with the corresponding point in the second image; and applying, by the processor, the correction to the virtual image display system.

21. The method of claim 13, wherein the first set of visual properties and the second set of visual properties include the color, and the method further comprises:

determining, by the processor, a color of an area in the first image;

identifying, by the processor, the discrepancy between the color of the area in the first image and a color of a corresponding area in the second image;

determining, by the processor, the correction to apply to the virtual image display system to match the color of the area in the first image with the color of the corresponding area in the second image; and applying, by the processor, the correction to the virtual image display system.

22. The method of claim 21, wherein the correction includes one or more of a correction in hue, saturation, or contrast.

23. The method of claim 13, wherein the first set of visual properties and the second set of visual properties include the geometry attribute, and the method further comprises:

determining, by the processor, the geometry attribute of an object in the first image;

identifying, by the processor, the discrepancy between the geometry attribute of the object in the first image and a geometry attribute of a corresponding object in the second image;

determining, by the processor, the correction to apply to the virtual image display system to match the geometry attribute of the object in the first image with the geometry attribute of the corresponding object in the second image; and applying, by the processor, the correction to the virtual image display system.

24. The method of claim 23, wherein the correction includes one or more of a correction in collinearity, curvature, length, width, breadth, added marks, missing marks, numerosity, shape, size, spatial grouping, or spatial orientation of the object in the second image.

* * * * *